7498X
G. W. Potter.
Making Lead Pipe.
Patented Mar: 23, 1838.
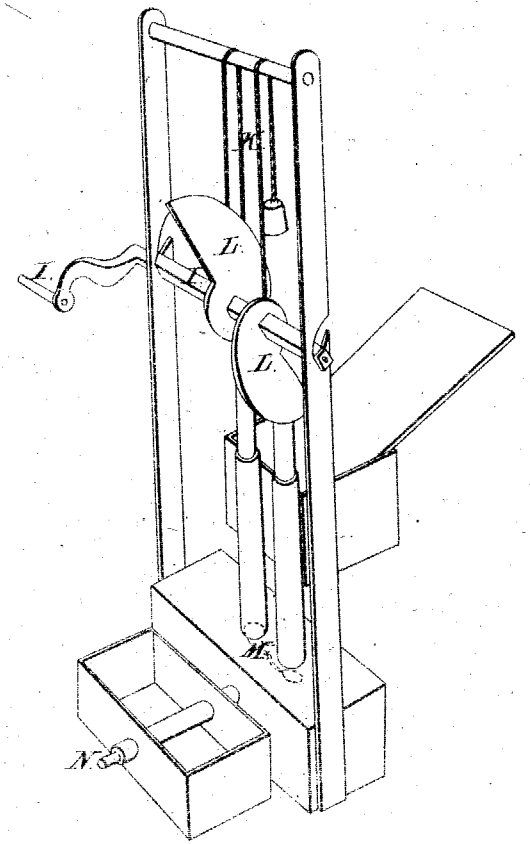

George W. Potter
Letters Patent Dated March 23. 1833.

The schedule referred to in these Letters Patent, and making part of the same, containing - - - a description in the words of the said George W. Potter himself of his improvement in the mode of manufacturing Leaden Pipes.

---

To all to whom these presents shall come:

Be it known that I George W. Potter of the Town of Otsego in the County of Otsego & State of New York, have invented a new & useful improvement in the art of manufacturing Lead pipes, for the purpose of conveying fluids & gases & that the following is a full & exact description of the construction & operation of the machine as invented by me.

1st an apron a of sheet iron [illegible] by 12, inches in an inclined situation to melt the lead upon. 2d a square box b. of cast iron to which the apron a is attached to receive the fusion, with two holes near the bottom in the side opposite the apron one half inch in diameter at c.c. each communicating with a separate pump J.D. which stand perpendicularly & are so constructed that they press alternately; the bore of each pump being three fourths of an inch in diameter.

At the bottom of the bore four inches below the communication with the box b at c.c. is a hole in each pump c.E. communicating with a tight vessel in the form of a cylinder E or square box of cast iron secured at each end by cast iron heads made fast by wrought iron bolts — In the inside of the cylinder at the mouths of the holes communicating with the pumps, are valves that play on a single pivot, so that the pressure of the piston in the pumps, operating on the lead, throws the one open & closes the other at the same

[illegible] 74987 time; and thus alternately.

On the opposite side at E, at the bottom of the cylinder or box, is a tube of cast iron attached to the box or cylinder by bolts, the diameter of the bore of which is equal to the diameter of the pipe required.. In the inside of the cylinder F are stands that support an iron rod, that pass thro the center of the bore of the tube G. of a size equal to the bore required in the lead pipe or a screw on the end of the rod with a nut will answer instead of the stands to support the rod in the centre of the pipe.

The tube passes thro a reservoir of water H, sufficient to cool the pipe, as fast as it is pressed into the tube G. & formed: from thence it is reeled or wound onto a reel or cylinder as fast as it is pressed out from the tube G.—

The piston of each pump is of cast iron and raises five inches from the bottom of the bore e E, & consequently one inch above the hole at c C, and thus the barrel of the pump between e E, & c, C, has time to fill with the fusion of lead from the box B, & the gearing is so constructed that the piston 2, will pass below the hole c, & begin its operation of pressing as soon as the piston 1, shall have ceased its pressure; so that a continued & steady pressure is maintained by means of wheels, part blank & part with teeth, that mesh in & out alternately into a double rack attached to each piston, the wheel bringing up the rack, is larger than the other, but with the same number of teeth & of the same mesh & revolves in the same time & brings up the piston 2, in time, to have it carried down below the hole c, in the same time, that the piston 1 is pressing from C to E, & thus alternately. The lead is kept from cooling by coals being placed around the apparatus necessary to be kept hot in an iron box, fitted to the apparatus, & as other models for working the apparatus may be applied with equal success your Petitioner

7498X

492 claim more particularly the mode of pressing or receiving the fused lead into a tube around a rod, & cooling it in its passage thro the tube in the manner before described, & thus forming the pipe. Dated at Troy 24 July 1833.

Geo W. Potter

Witness
Saml S. Whitmore
William Babcock.

Received & Recorded anew 15 April 1845

Per mode

Drawing

Exa.
99K